United States Patent [19]

Jackson

[11] 3,724,807
[45] Apr. 3, 1973

[54] PINCH VALVE SLEEVE

[75] Inventor: Lawrence D. A. Jackson, Montreal, Quebec, Canada

[73] Assignee: Lawjack Equipment Limited, Montreal, Quebec, Canada

[22] Filed: Dec. 23, 1970

[21] Appl. No.: 100,895

[52] U.S. Cl. ..................251/7, 138/121, 138/137
[51] Int. Cl. .......................F16k 7/06, F16l 11/08
[58] Field of Search.................251/4–10; 138/121, 138/126, 137

[56] References Cited

UNITED STATES PATENTS

| 3,197,173 | 7/1965 | Taubenheim | 251/6 |
| 2,342,192 | 2/1944 | Grigsby | 251/8 |
| 2,726,682 | 12/1955 | Conroy et al. | 138/137 X |
| 3,047,026 | 7/1962 | Kahn | 138/121 X |
| 2,578,140 | 12/1951 | Krupp et al. | 138/121 X |

FOREIGN PATENTS OR APPLICATIONS

| 1,193,468 | 4/1959 | France | 251/8 |
| 225,647 | 11/1959 | Australia | 285/229 |

Primary Examiner—Henry T. Klinksiek
Assistant Examiner—Richard Gerard
Attorney—Fetherstonhaugh & Co.

[57] ABSTRACT

A pinch valve sleeve having an inner wall of elastomeric material and reinforcing outer wall of fabric and a pair of circumferential reinforcing members built into the outer wall of fabric, the reinforcing members being located adjacent the end portions of the valve sleeve.

4 Claims, 3 Drawing Figures

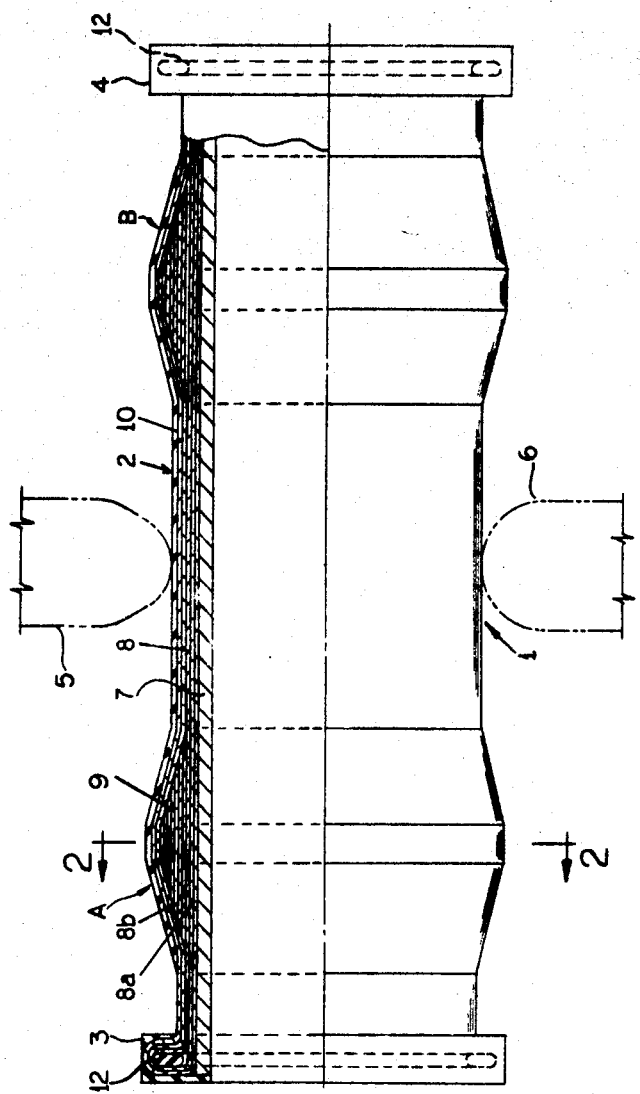

PINCH VALVE SLEEVE

This invention relates to sleeves for pinch valves. Pinch valves have a resilient sleeve having a longitudinal bore defining a fluid flow path. The valve is closed by deforming opposite side walls of the bore into contact substantially to close the fluid flow path. The deformation may be caused by applying fluid pressure to the exterior walls of the sleeve or by squeezing the sleeve between upper and lower anvils by mechanical action.

The ends of the sleeve are normally held in spaced-apart positions, for example, by having integral flanges on the sleeve which are bolted to flanges on the ends of pipe lines. When the valve is closed the sleeve must accommodate the increased length of the body of the sleeve between the flanges caused by curvature of the sleeve. This causes strain in fabric reinforcing layers of the sleeve and leads to a short working life of the sleeve.

When pinch valves are used in a partly open condition in order to reduce or throttle the flow of fluid through the line to which they are connected, the sleeve tends to take the shape of a Venturi. The result is that a vacuum develops on the downstream end of the pinch. This vacuum is unstable and the internal pressure variations induce a flexing in the valve sleeve, which can cause early destruction to the valve sleeve, and in addition the fluttering produced in the sleeve by the Venturi effect can lead to severe vibration in the entire piping system. The existence of this phenomen has made it necessary to put severe limits on the throttling range in which pinch valves can be safely employed.

The basic solution to the problem of fluttering of valve sleeves under partly closed or throttling conditions, is to produce a sleeve which is sufficiently stiff so that it will not tend to collapse under the vacuum effect, and will thus maintain a stable shape.

According to the present invention there is provided in a sleeve for a pinch valve comprising a tubular body member having an elastomeric inner wall defining a substantially smooth fluid flow path, and circumferential fabric reinforcing layers extending along the length of the body member outside the inner wall, the body member having a portion adapted to be deformed substantially to close said fluid flow path, said layers having a length greater than the distance between the ends of the body member. Preferably, the body member is substantially cylindrical and, at two longitudinally spaced-apart locations, are adjacent to but spaced from each of the end flanges, the body is reinforced by a pair of circular reinforcements, including layers of elastomeric material and fabric.

Each of the circular reinforcements are built of layers of fabric and have a longitudinal section in the form of a flattened frustrum of a cone. These circular reinforcements may or may not have a built-in layer of an elastomeric material. The outer surface of the sleeve and the reinforcements are covered by a layer of an elastomeric material.

By the use of two separate reinforcing rings, located adjacent the end portions of the pinch sleeve, extra stiffness is provided to the sleeve on the downstream side of the pinch, no matter in which direction through the valve the flow may be.

The end flanges of the sleeve may or may not be reinforced by a metal ring covered by layers of fabric and an elastomeric material.

The present invention is a modification of the pinch valve sleeve disclosed in my copending patent application Ser. No. 101,049 filed Dec. 23, 1970, and may include the oppositely disposed reinforcing arcuate shaped members in the mid-portion of the sleeve as disclosed in that copending application if desired.

The invention will be described, by way of example, with reference to a preferred embodiment illustrated in the accompanying drawings, in which:

FIG. 1 is a longitudinal view, partly in section of a pinch valve sleeve according to the present invention.

Figure 3:
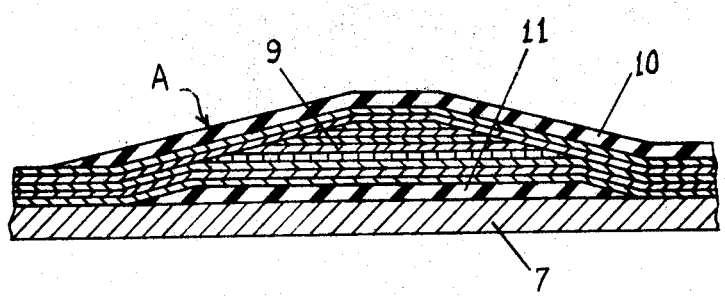
FIG. 3 is a partial longitudinal section taken from FIG. 1 but showing a modified form of the reinforcements.

In the embodiment of the invention here shown for illustrative purposes the sleeve 1 shown having a body member 2 and end flanges 3 and 4.

Means, not shown, are provided in the pinch valve assembly for applying pressure to the body member. This means may include a jacket surrounding the sleeve, into which pressurized fluid may be introduced for the purpose of compressing the sleeve to reduce the flow of fluid therethrough. Alternatively, the sleeve may be compressed by anvil means shown diagrammatically at 5 and 6 in FIG. 1.

The body member 2 is cylindrical and has an inner wall 7 of non-corrosive elastomeric material.

The body member 2 is reinforced by a plurality of layers 8 of fabric which are wrapped circumferentially about the inner wall 7. In addition the body member 2 is circumferentially reinforced with additional material at two areas A and B. One area A of reinforcement being located adjacent to but spaced from the end flange 3, while the other area B of reinforcement is located adjacent to but spaced from the end flange 4.

Figure 2:
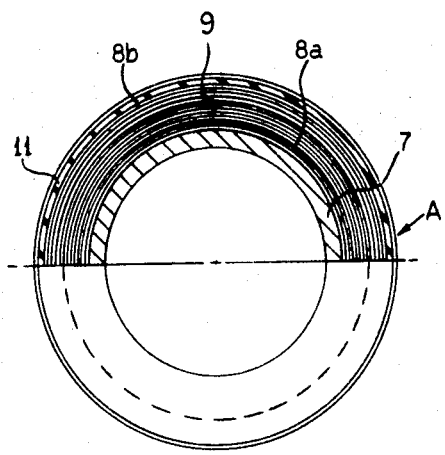
FIG. 2 is a transverse section taken on the line 2—2 of FIG. 1.

Each of the circumferentially reinforced areas A and B has a longitudinal cross-section in the form of a frustrum of a cone and consists of layers 9 of fabric which are preferably placed between inner and outer layers 8a and 8b of the layers of fabric 8, in the manner shown in FIG. 2.

The outer surface of the body member 2 is covered by a layer of an elastomeric material 10 which extends longitudinally over the mid portion of the sleeve and over the reinforced areas A and B and, if desired may extend as far as the end flanges 3 and 4.

The end portions of the layers 8 of the reinforcing fabric may be wrapped about metal end rings 12 and are sealed by a layer of elastomeric material to form the end flanges 3 and 4. Alternatively the end portions of the layers 8 of the reinforcing fabric may be formed into a flange shape without metal end rings.

In the modification shown in FIG. 3 of the drawings an annular layer 11 of an elastomeric material is shown wrapped about the outer surface of the inner wall 7 to form the base of the reinforced areas A and B. This annular layer 11 deforms the inner fabric layers 8a to increase their length longitudinally of the sleeve and the outer fabric layers 8b are deformed by the reinforcing fabric layers 9.

In use of the sleeve and upon closure of the valve, whether by application of external pressurized fluid or by means of anvils 5 and 6, pressure is applied to the mid portion of the sleeve between the reinforced areas A and B to bring the opposed walls of the flow path together.

This application of pressure and deformation causes the opposed walls of the sleeve to curve and to have increased length. By providing increased fabric length such as by the sections of layers 8a and 8b incorporated in the reinforced areas A and B, the fabric layers 8 in that section of the sleeve between the reinforced areas A and B do not have to stretch appreciably to accommodate the increased length of the sleeve. Rather, as the inner wall 7 stretches, the radial fabric layers 8a and 8b in the areas A and B provide the required increased fabric length. Thus, there is less strain on the fabric layers as a whole, leading to longer life of the sleeve.

On opening of the valve the additional fabric material within the areas A and B will tend to return to their original position, assisted by the inner annular rings of elastomeric material 9 and the outer surface of elastomeric material 11.

The reinforced areas A and B, being in the form of flattened frustrums of cones, taken in longitudinal section, effectively reinforce the sleeve in the areas between the end flanges 3 and 4 and the mid section of the sleeve where force is applied to close the valve, yet have sufficient elasticity built into them to ensure that the sleeve will, throughout its whole length, return to its normal configuration on release of closing pressure.

The reinforced areas A and B sufficiently stiffen the sleeve as to prevent fluttering of the sleeve under partly closed or throttling conditions so as to prevent collapse of the sleeve under the vacuum effect. Such a sleeve will thus maintain a stable shape under all operating conditions.

This built-in strength and elasticity will ensure that the valve can be operated to open and close over a longer working life than has hitherto been possible in the past.

The embodiments of the invention in which an exclusive property or privilege is claimed are defined as follows:

1. A sleeve for a pinch valve comprising a tubular body member having an elastomeric smooth tubular inner wall defining a smooth fluid flow path, circumferential fabric layers extending along the length and between the ends of the body member outside the inner wall, a pair of mounting flanges provided at the ends of the body member, and a pair of axially spaced circumferentially extending reinforcements located about said inner wall in axially inwardly spaced relation from said mounting flanges, said reinforcements having a cross-section, in the longitudinal direction of the sleeve, in the form of a shallow frustrum of a cone, said reinforcements consisting of a layer of elastomeric material wrapped about said elastomeric inner wall and layers of fabric of decreasing width interposed between layers of said first mentioned fabric layers, the portion of the body member between said reinforcements being adapted to be deformed substantially to close said flow path.

2. A pinch valve sleeve according to claim 1 in which said fabric layers have a greater length than the distance between the ends of said inner wall.

3. A pinch valve sleeve according to claim 1 in which some of the first mentioned layers of fabric adjacent said inner wall are deformed to increase their length longitudinally of the sleeve by said reinforcing layers of elastomeric material and the remaining outer layers of the fabric are deformed by the reinforcing layers of fabric.

4. A pinch valve sleeve according to claim 1 in which the outer surface of the sleeve is covered by a layer of elastomeric material.

* * * * *